United States Patent [19]

Lubachevsky

[11] Patent Number: 5,721,764
[45] Date of Patent: Feb. 24, 1998

[54] CONFERENCE MAILBOX SERVICE

[75] Inventor: Boris Dmitrievich Lubachevsky, Bridgewater, N.J.

[73] Assignee: AT&T, Middletown, N.J.

[21] Appl. No.: 576,388

[22] Filed: Dec. 21, 1995

[51] Int. Cl.[6] ................................................ H04M 3/50
[52] U.S. Cl. ........................ 379/89; 379/112; 379/202; 379/204
[58] Field of Search .................................... 370/260, 261, 370/262; 379/202, 203, 204, 205, 206, 67, 88, 89, 111, 112, 113, 114, 115

[56] References Cited

U.S. PATENT DOCUMENTS

| | | | |
|---|---|---|---|
| 4,837,798 | 6/1989 | Cohen et al. | 379/88 |
| 4,972,461 | 11/1990 | Brown et al. | 379/67 |
| 5,408,526 | 4/1995 | McFarland et al. | 379/202 |
| 5,440,624 | 8/1995 | Schoof, II | 379/202 |
| 5,483,588 | 1/1996 | Eaton et al. | 379/202 |
| 5,528,670 | 6/1996 | Elliot et al. | 379/89 |
| 5,559,875 | 9/1996 | Bieselin et al. | 379/202 |

*Primary Examiner*—Krista Zele
*Assistant Examiner*—Daniel S. Hunter
*Attorney, Agent, or Firm*—Henry T. Brendzel

[57] ABSTRACT

A service establishes conference mailboxes (CMB) for specified durations of time upon request by a user. The CMB service permits a CMB to be accessed by any number of other users authorized by the requesting user. The CMB service also advantageously conferences together authorized users accessing a CMB concurrently. The CMB is advantageously implemented by a CMB control system comprising a processor and memory which CMB control system is connected to a communications network.

6 Claims, 3 Drawing Sheets

CONFERENCE MAILBOX SERVICE

TECHNICAL FIELD

The invention relates to the field of communication services and particularly to mailbox services.

BACKGROUND

Communication systems enable users to transfer information (e.g. signals representing voice, text, video and data) between terminals (e.g. wired telephones, personal computers and wireless terminals such as cellular phones) connected to the system. Although users can readily transfer information, each user must have access to a terminal to do so. Such access is not always readily available (such as when a user is mobile and does not have a wireless terminal. Thus, communication systems typically provide services which allow information to be received when a user is unavailable or unable to access a terminal connected to the communications system. In particular, a communications system may assign a user a "mailbox" in which the information sent to the user is stored if the user is unavailable. A mailbox is a device or medium (e.g., random access memory or magnetic tape) in which information may be stored. The user may later access the mailbox to retrieve the stored information.

One example of a mailbox service is a voice mailbox service advantageously implemented in a telephone network. When a called party is unavailable to receive a telephone call, the called party may record a voice message. Notification is then provided to the called party indicating the presence of a message that is waiting to be accessed. The notification, for example, may be an illuminated button on a telephone. Mailboxes have also found use in electronic mail applications where information comprising electronic messages are stored until a user is ready to open or access the electronic message.

The use of mailbox services has alleviated many problems encountered when a user is unavailable to receive information. For example, use of mailbox service has eliminated the need to make repetitive attempts to transfer the information thereby saving user time and saving system resources. However, mailbox services still have several shortcomings. For example, users typically pay for mailbox services and/or for equipment to facilitate those services regardless of how often the service is used. Thus, such services may not be cost-effective for users who wish limited mailbox services. Further, information in a mailbox cannot typically be shared. Specifically, access to a particular mailbox is typically limited to a particular user which particular user keeps a password, for accessing the system, a secret. Thus, access to a mailbox by more than one user raises security issues since the password would no longer be known by only a single user. Thus, there is a need for expanded mailbox services to overcome these shortcomings.

SUMMARY

In accordance with the present invention a conference mail box service is used in a communications network which service establishes a conference mailbox at a user's request for a specified, limited duration of time. The established conference mail box is assigned an identification number and is accessed by a password. The user can specify a set of services to be associated with the established conference mail box, and the service advantageously conferences together a set of users concurrently accessing an established conference mail box.

DETAILED DESCRIPTION

Figure 1:
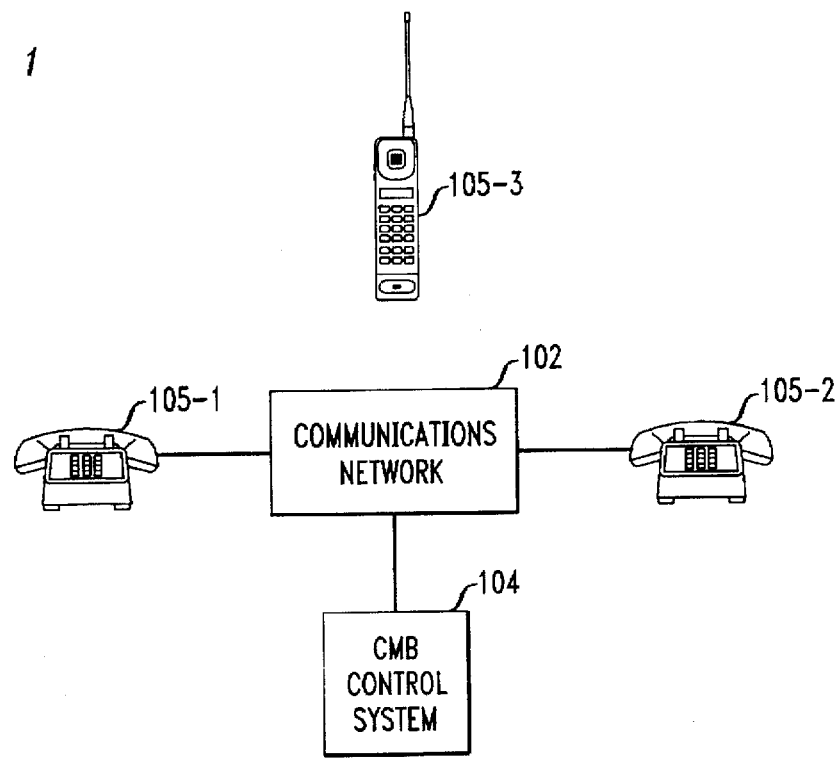
FIG. 1 illustrates a system in which the inventive method may be practiced.

FIG. 1 illustrates communications system 100 in which the inventive method for providing a conference mailbox (CMB) service may be practiced. The service establishes a CMB for a user upon request for a specified period of time. The CMB may be used to store information which may be accessed by authorized users. Communication system 100 comprises terminals 105-$i$ which may be used by users of communication system 100 for sending and receiving information via communications network 102. Communications network 102 may be, for example, the AT&T public switched network. Terminals 105-$i$ may be wired terminals (such as terminals 105-1 and 105-2 which are wired telephones) or wireless terminals (such as a cellular phone). Connected to communications network 102 is CMB control system 104 which is advantageously used to implement the CMB service.

Figure 2:
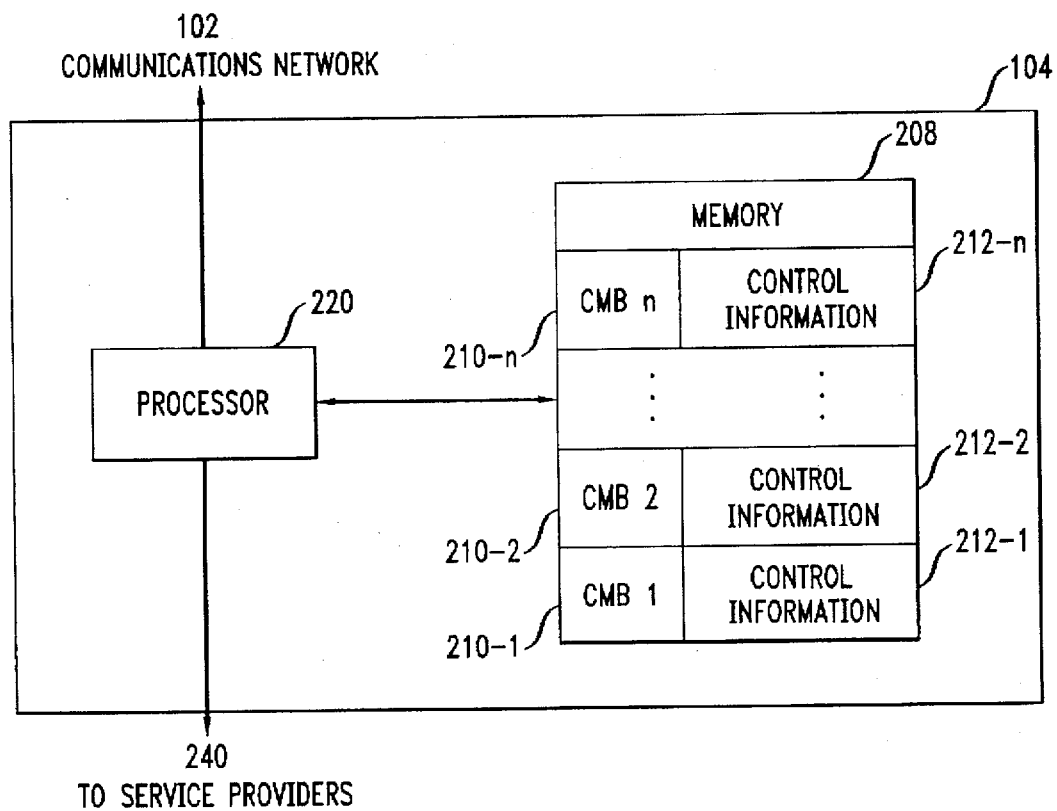
FIG. 2 illustrates a system for providing a conference mailbox service.

CMB control system 104 is illustrated in further detail in FIG. 2. CMB control system comprises processor 220 and memory 208. Processor 220 is connected to communications network 102, and thus processor 102 is able to receive a request to establish (or reestablish) a CMB or to extend the duration of an already-established CMB. CMB 210-$j$ is advantageously implemented in memory 208 which memory also comprises portion 211-$j$ for storing control information associated with each respective CMB 210-$j$. Portion 211-$j$ advantageously stores control information relating to, for example: the duration of the CMB, passwords and authorized services, as described below. Processor 220 is also advantageously connected to service providers 240 which service providers supply additional information (e.g. stock market or news reports) which may be accessed by users of the CMB service.

Figure 3:
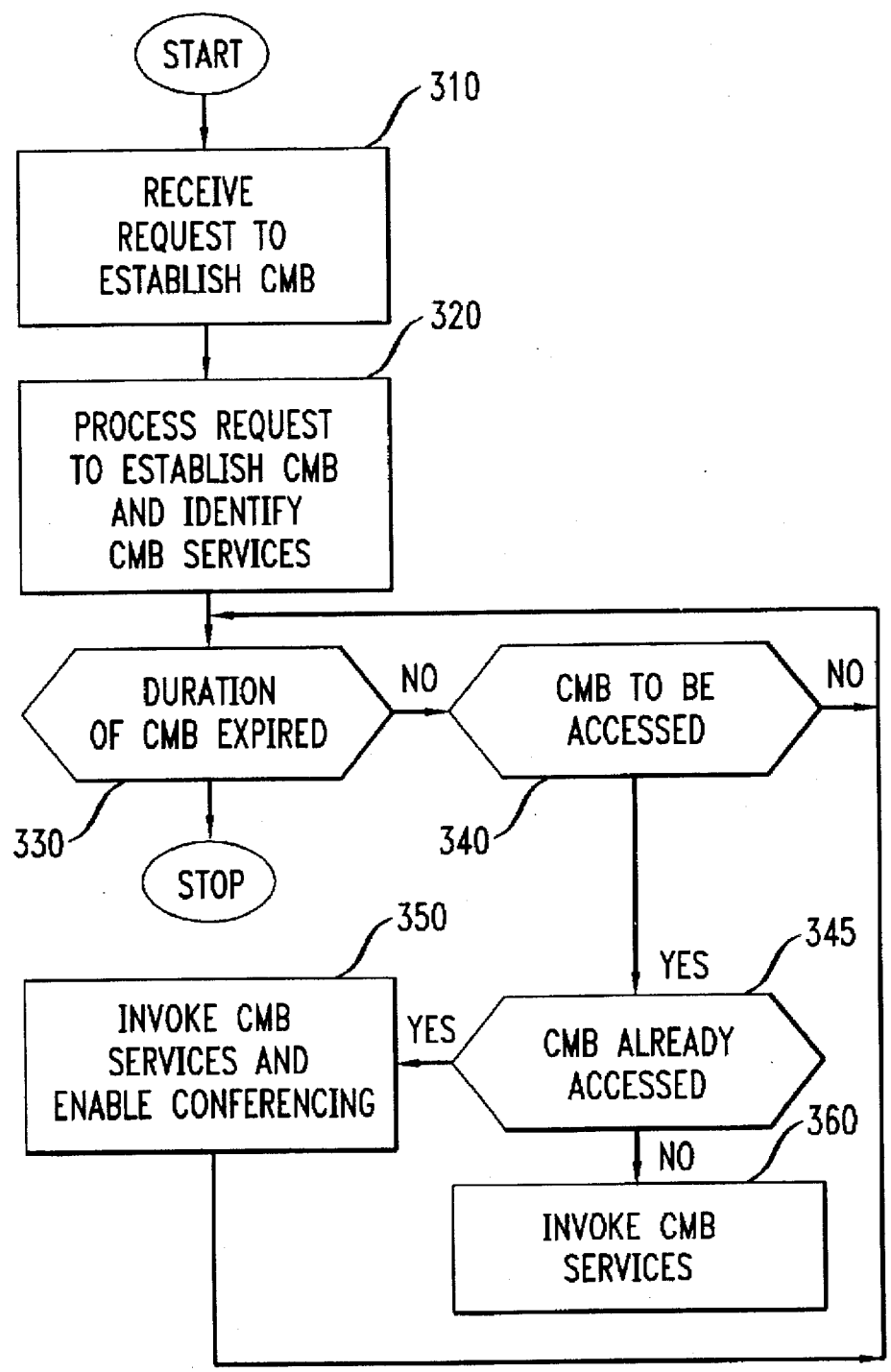
FIG. 3 illustrates steps in the inventive method for providing a conference mailbox service.

FIG. 3 is a flow chart of steps in the inventive method for a conference mailbox service. A request regarding a conference mailbox (CMB) is received from a terminal (e.g terminal 105-$i$ of FIG. 1) in step 310 and is advantageously relayed to CMB control system 104. A request may be initiated, for example, by a user of the terminal by dialing a specific telephone number assigned to a CMB service provider. The request is processed in step 320.

Figure 4:
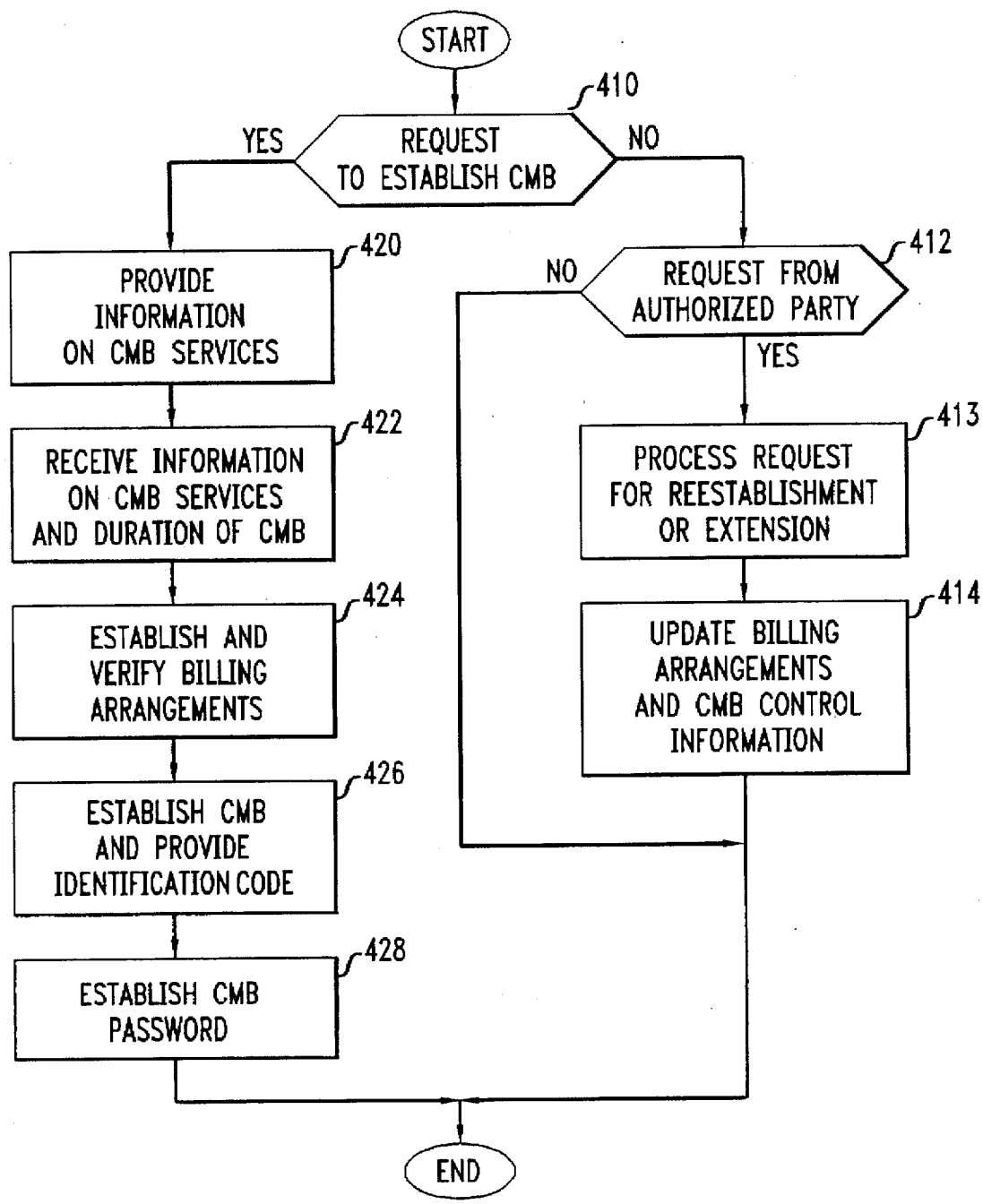
FIG. 4 illustrates additional steps for providing a conference mailbox service.

FIG. 4 illustrates further steps useful in executing step 320. In steps 410 and 412, it is determined whether the request is to establish a CMB or to re-establish/extend/modify a previously establish CMB. If the request is to establish a CMB (i.e. the "yes" branch from decision box 410 is followed), steps 420–428 (which form a part of a set of CMB management procedures) are invoked. In step 420 information regarding CMB service are advantageously provided. For example, the information may specify fees involved for establishing the mailbox and specify additional fees based on usage. The information may also specify additional service features (e.g. news and financial reports) that are available (advantageously from service providers 240). In step 422, information is received relating to the duration for which the CMB is to be established and relating to which additional service features, if any, are desired. In step 424 a preferred billing arrangement is established (e.g. whether the costs of the CMB are billed to a user's home phone or credit card) and the billing arrangement is verified (e.g. credit card authorization is obtained).

Once billing arrangements are determined, the CMB system then assigns the user a mailbox in step 426. The mailbox advantageously specified by an identification number. The assigned mailbox is advantageously accessed by dialing a specified phone number (which number may be a toll free number) and by inputting the identification number of the mailbox. Additional security is advantageously provided by, at the time of CMB set up in step 428, having the requesting user specify a password which password is needed to access the CMB after it is identified. In practice once a user establishes a CMB, the user will tell a select group of other users the CMB identification number and password so that users in the select group may also access the CMB. Information used to control the operation of the $k^{th}$ CMB (e.g. passwords, the time period over which the CMB will be established, services desired) is advantageously stored as control information in portion 211-$k$ of memory 208 in CMB control system 104.

If the request is to re-establish or extend a previously established CMB or to modify (i.e. the "no" branch from decision box 410 is followed), steps 412–414 in the set CMB management procedures are invoked. In step 412, the procedures determine if the request is from an authorized party. Parties authorized to re-establish, extend the duration of, or modify control information associated with, an established CMB are advantageously specified at the time of CMB set-up (i.e. when steps 420–428 are invoked). For example, authorized parties may be given a "super password" which super password not only permits access to the CMB but also permits changes to be made to an existing CMB and permits a CMB that has expired, for example within a specified time period, to be reestablished. If the party is authorized, billing arrangements and CMB control information are updated in step 414. If the party is not authorized, the CMB management procedures end. Either the user who requested the CMB originally or the authorized party may (with proper verification of billing arrangements) be charged for the extension, re-establishment or modification of the CMB. The CMB management procedures are advantageously invoked using manual techniques (such by using operators) or by automated techniques (such as the CONVERSANT® voice information system) or by combinations of automated and manual techniques.

Returning to FIG. 3, in step 330 the CMB service checks to determine if the time for terminating the CMB has occurred. If it has, the CMB is terminated and may no longer be accessed. As discussed above, however, the CMB service advantageously permits the same CMB to be reestablished or extended upon proper billing arrangements (steps 410–414 of FIG. 4).

In step 340, the service checks to see if the access to the CMB is desired. If access is desired, in step 345 the service determines if other users are accessing the CMB. If no others users are accessing the CMB, the CMB services specified when the CMB was established are invoked in step 360. If one or more other users are accessing the CMB, the CMB services are invoked and the conferencing service is enabled in step 350. Thus, the CMB service, in addition to permitting access to stored messages, advantageously provides other features. For example, the CMB service may accept collect calls (advantageously authorized by the CMB requester) from users authorized to access information in the CMB. Further, if several users are accessing the CMB concurrently, the CMB service (rather than permitting only one-at-a-time, sequential access to the CMB by users) can advantageously conference these users together to allow those users to exchange information among themselves thereby ensuring that the users have the latest information. In particular, the CMB service allows a group of users to establish a conference communication link without using a prespecified terminal. For example, two users can speak to each other while both being on the road and using public phones. Finally, the CMB service may advantageously provide status information (e.g. what are the charges accumulated this far for the CMB, who has accessed the CMB, time left for the CMB) as well as other information (e.g. stock market information).

Thus, the CMB service advantageously establishes CMBs for a limited duration, which CMBs may be accessed by more than one user. The CMB service advantageously provides a set of additional features (e.g. collect call receiving and status information) and permits authorized users to access other additional services (e.g. news reports).

Fraudulent use of the CMB service is readily limited. First, since a CMB is established for relatively short period of time (perhaps on the order of several hours), the potential for fraud is reduced. Additionally, safeguards may be established in the set of CMB management procedures. For example, the geographic regions from which collect calls may be accepted may be restricted or the amount of time for which a CMB may be extended can be limited. Also, multiple passwords may be required to access certain information (e.g. who has accessed the system) or to access certain services for which a premium may be charged (e.g. access to stock market information).

The method disclosed herein has been described without reference to specific hardware or software. Instead the method has been described in such a way that those skilled in the art can readily adapt such hardware or software as may be available or preferable. The inventive method may be used to for information of any type, including information representing speech, text, video or data.

What is claimed is:

1. A method of managing a communications network by operating a mailbox service, said method comprising the steps of:

receiving a request to establish a mail box and maintain it for a given time period, which mail box is accessible simultaneously by more than one authorized user and where any authorized user can place information into the mailbox or extract information out of the mailbox at anytime during said time period, establishing said mail box for said time period, and billing for said mail box based on access and usage of said mail box.

2. The method of claim 1 wherein said request specifies whether access to the mail box is to be granted to collect-call users.

3. The method of claim 1 wherein the accessing by more than user is permitted for the purpose of retrieving stored information as well as for real-time communication between the users.

4. The method of claim 1 further comprising the step of:

extending said time period in response to a request from an authorized user.

5. The method of claim 1 further comprising the step of providing a user who accesses the mail box with information that is stored in the mailbox by the party providing the mail box.

6. The method of claim 5 wherein the information provided to a user who accesses the mail box comes from a set comprising information regarding charges accumulated so far for the mail box, information regarding who accessed the mail box, information regarding time left for the mail box, and temporally sensitive data supplied by other than users accessing the mail box.

* * * * *